(12) United States Patent
Konda et al.

(10) Patent No.: US 11,343,510 B2
(45) Date of Patent: May 24, 2022

(54) METHODS AND APPARATUS FOR DETERMINING ROTATION ANGLE FOR SPHERICAL MULTIMEDIA CONTENT

(71) Applicant: SAMSUNG ELECTRONICS CO., LTD., Suwon-si (KR)

(72) Inventors: Akhil Konda, Bangalore (IN); Anubhav Singh, Bangalore (IN); Sri Nitchith Akula, Bangalore (IN); Chirag Mahesh Kumar Pujara, Bangalore (IN); Raj Narayana Gadde, Bangalore (IN); Amith Dsouza, Bangalore (IN); Ramkumaar Kk, Bangalore (IN); Nishant Sharma, Bangalore (IN); Woongil Choi, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/967,041

(22) PCT Filed: Apr. 3, 2019

(86) PCT No.: PCT/KR2019/003946
§ 371 (c)(1),
(2) Date: Aug. 3, 2020

(87) PCT Pub. No.: WO2019/194576
PCT Pub. Date: Oct. 10, 2019

(65) Prior Publication Data
US 2021/0051331 A1 Feb. 18, 2021

(30) Foreign Application Priority Data

Apr. 3, 2018 (IN) .............................. 201841012720
Mar. 29, 2019 (IN) .............................. 201841012720

(51) Int. Cl.
*H04B 1/66* (2006.01)
*H04N 19/14* (2014.01)
(Continued)

(52) U.S. Cl.
CPC ............ *H04N 19/14* (2014.11); *H04N 19/117* (2014.11); *H04N 19/15* (2014.11); *H04N 19/17* (2014.11);
(Continued)

(58) Field of Classification Search
CPC ............. H04N 19/597; H04N 5/23238; H04N 13/161; H04N 13/178; H04N 13/194;
(Continued)

(56) References Cited

U.S. PATENT DOCUMENTS 6,204,854 B1  3/2001  Signes et al.
8,610,758 B2  12/2013  Cheng et al.
(Continued)

FOREIGN PATENT DOCUMENTS

WO  2008106994 A1  9/2008

OTHER PUBLICATIONS

Communication dated Jul. 20, 2020, from the European Patent Office in counterpart European Application No. 19781412.2.
(Continued)

*Primary Examiner* — Masum Billah
(74) *Attorney, Agent, or Firm* — Sughrue Mion, PLLC

(57) ABSTRACT

Provided are a method and an apparatus for determining an optimal rotation angle during compression of a spherical multimedia content where the processor may receive first multimedia content corresponding to the spherical multimedia content, generate a plurality of second multimedia contents based on the first multimedia content by rotating the first multimedia content to a plurality of rotation angles, perform an edge analysis on each of the plurality of the
(Continued)

ERP

ISP second multimedia contents, identify the number of edges aligned to one of a vertical axis or a horizontal axis based on the edge analysis, select second multimedia content with the maximum number of edges, and determine an optimal rotation angle.

13 Claims, 10 Drawing Sheets

(51) Int. Cl.
    *H04N 19/117*     (2014.01)
    *H04N 19/15*     (2014.01)
    *H04N 19/17*     (2014.01)
    *H04N 19/46*     (2014.01)
    *H04N 19/597*     (2014.01)
    *H04N 21/234*     (2011.01)

(52) U.S. Cl.
    CPC ........... *H04N 19/46* (2014.11); *H04N 19/597* (2014.11); *H04N 21/23418* (2013.01)

(58) Field of Classification Search
    CPC .... H04N 21/816; H04N 19/167; H04N 19/70; H04N 13/117; H04N 19/174; H04N 19/46; H04N 21/23439; H04N 21/4728; H04N 21/6587; H04N 21/8456; H04N 13/243
    USPC ........................................................ 375/240
    See application file for complete search history.

(56) References Cited

U.S. PATENT DOCUMENTS

| | | |
|---|---|---|
| 2008/0266398 A1 | 10/2008 | Ferguson |
| 2015/0078441 A1 | 3/2015 | Han et al. |
| 2015/0245020 A1* | 8/2015 | Meier ................. G06T 7/73 348/135 |
| 2019/0342577 A1* | 11/2019 | Alshina ................. H04N 13/00 |
| 2020/0053393 A1* | 2/2020 | Niamut ................. G06T 7/90 |

OTHER PUBLICATIONS

Jill Boyce et al. "AHG8: Spherical rotation orientation SEI for coding of 360 video" Joint Video Exploration Team (JVET) of ITU-T SG 16 WP 3 and ISO/IEC JTC 1/SC 29/WG 11, 5th Meeting: Geneva, CH, Jan. 12-20, 2017, (8 pages total) XP030247627.

Elena Alshina et al. "Discontinuity Minimization for Omnidirectional Video Projections" Proceedings of SPIE, vol. 10396, Sep. 19, 2017, XP060093544.

International Search Report and Written Opinion (PCT/ISA/210 and PCT/ISA/237), dated Jul. 31, 2019 by International Searching Authority in International Application No. PCT/KR2019/003946.

F. Pan et al. "Measuring blocking artifacts using edge direction information [image and video coding]" 2004 IEEE International Conference on Multimedia and Expo, Jun. 27-30, 2004 (6 pages total).

V. Zakharchenko et al. "AhG8: Coding performance impact of omnidirectional projection rotation" Joint Video Exploration Team (JVET) of ITU-T SG 16 WP 3 and ISO/IEC JTC 1/SC 29/WG 11, 5th Meeting: Geneva, CH, Jan. 17, 2017 (7 pages total).

* cited by examiner

【Figure 1A】
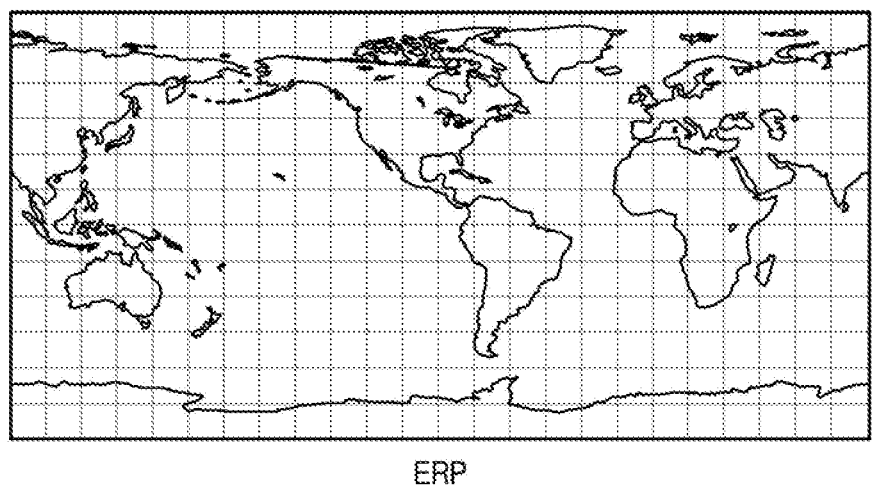
【Figure 1B】
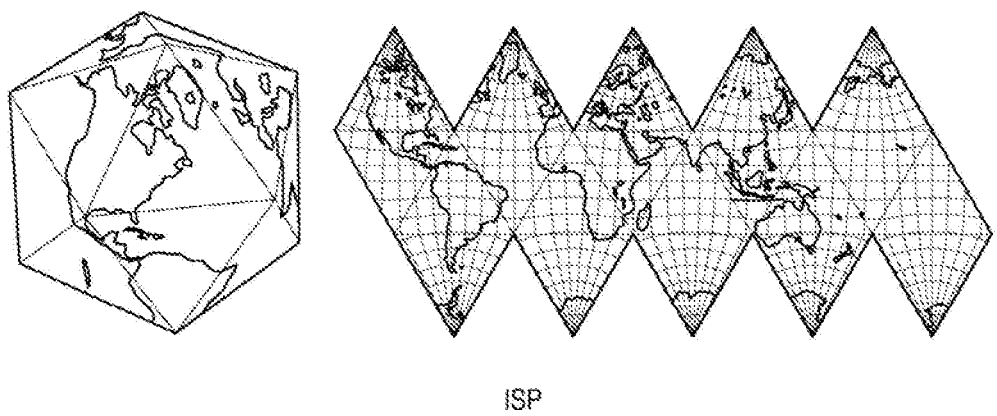

【Figure 1C】
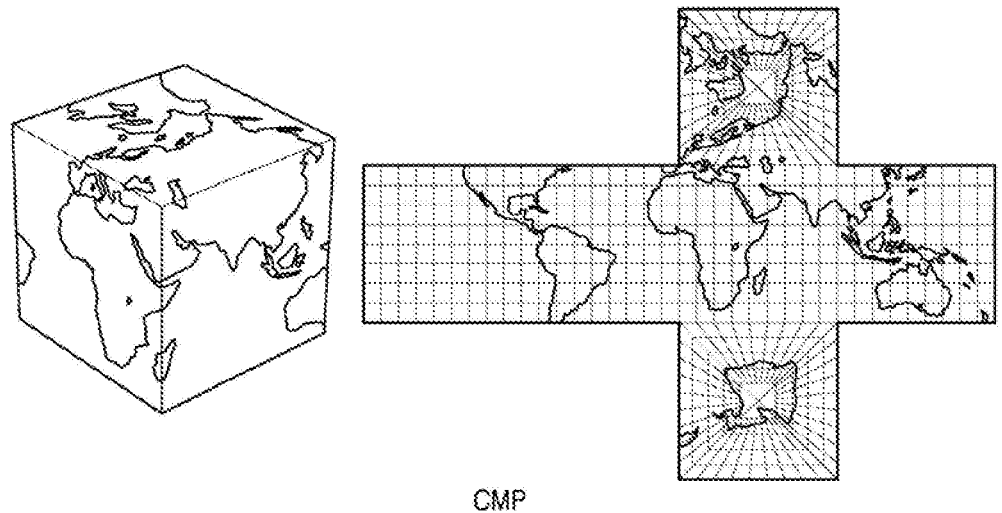
CMP
【Figure 1D】
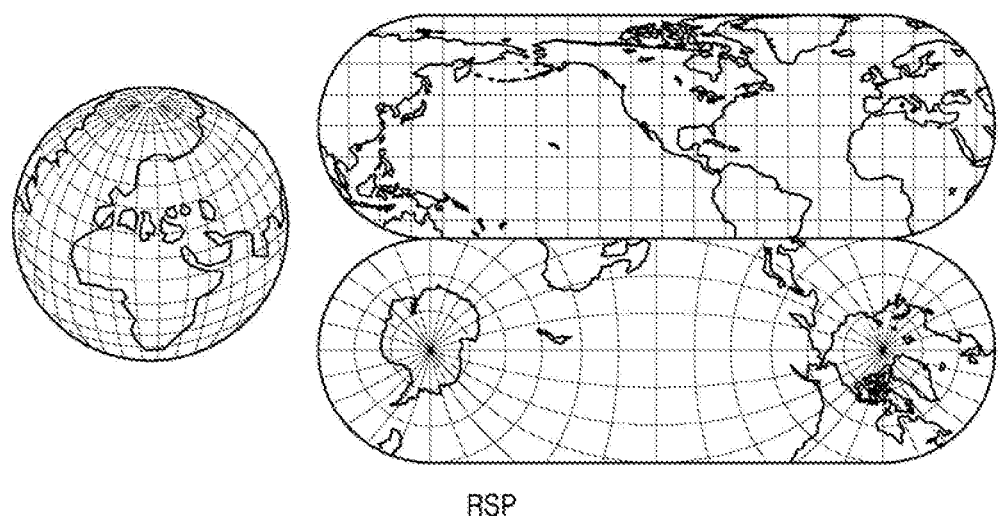
RSP

【Figure 2A】
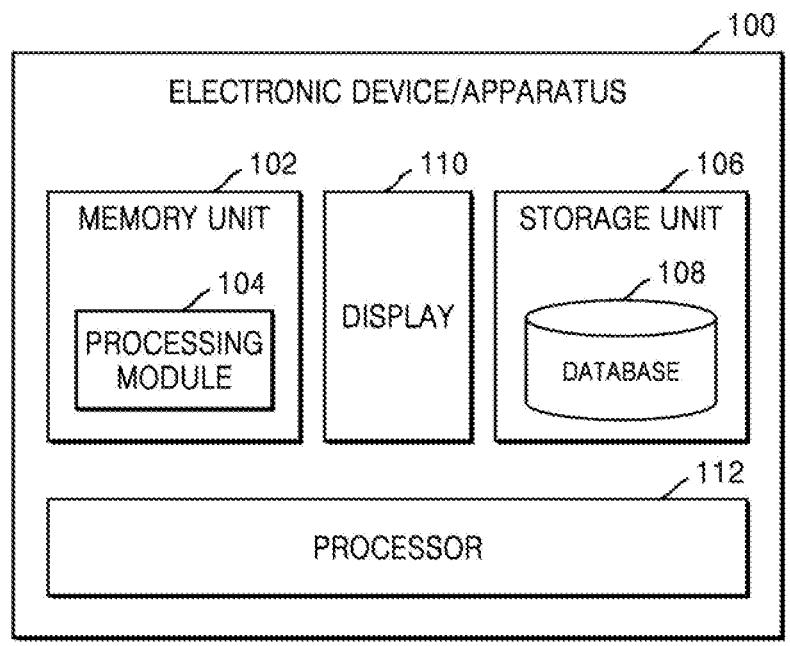
【Figure 2B】
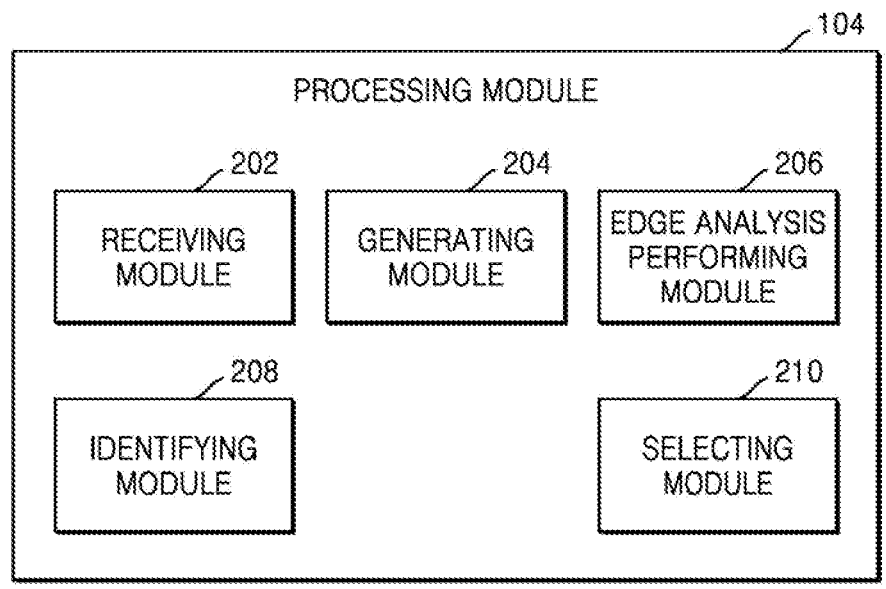

【Figure 3A】
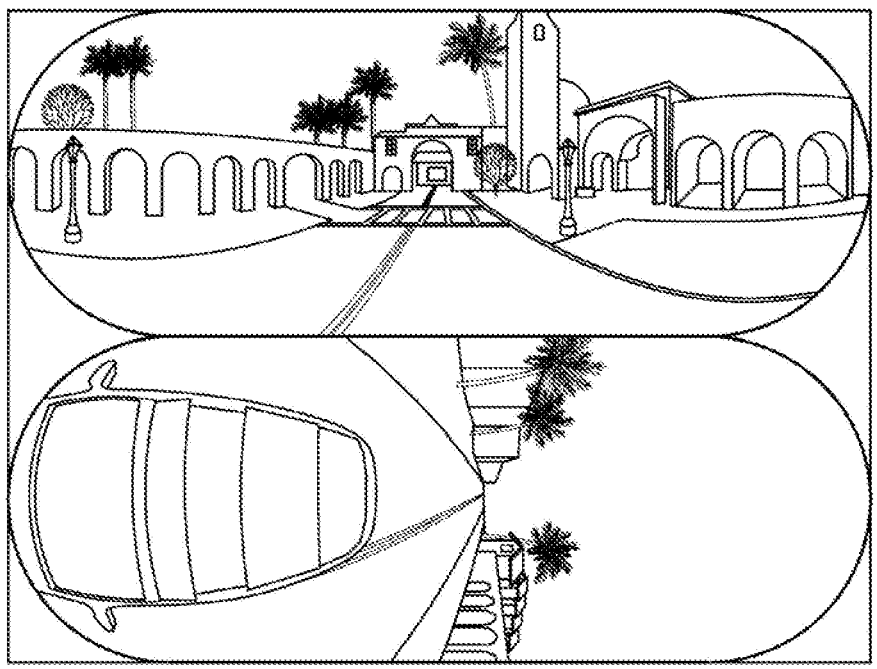
【Figure 3B】
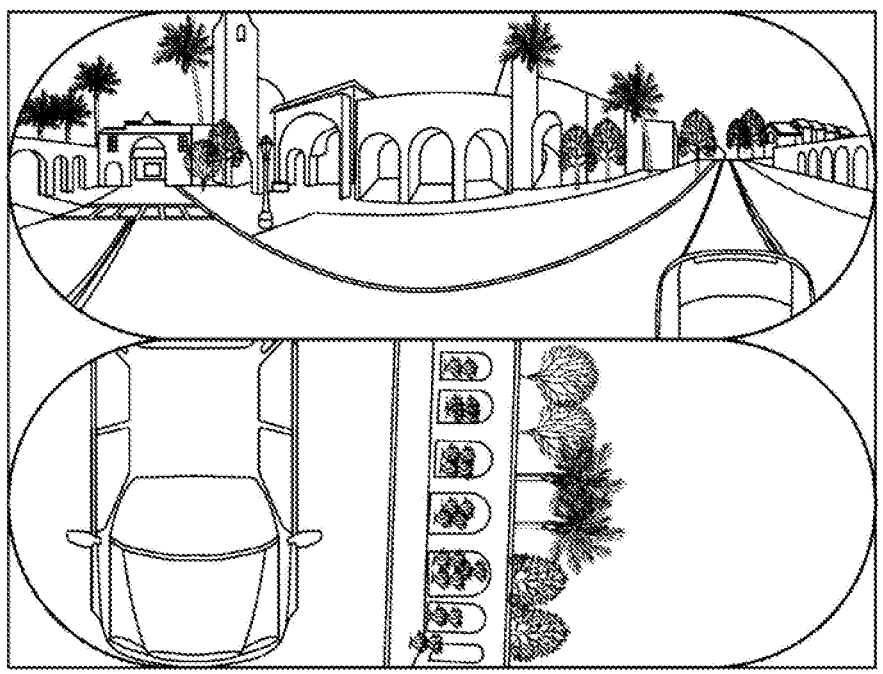

【Figure 3C】
【Figure 3D】
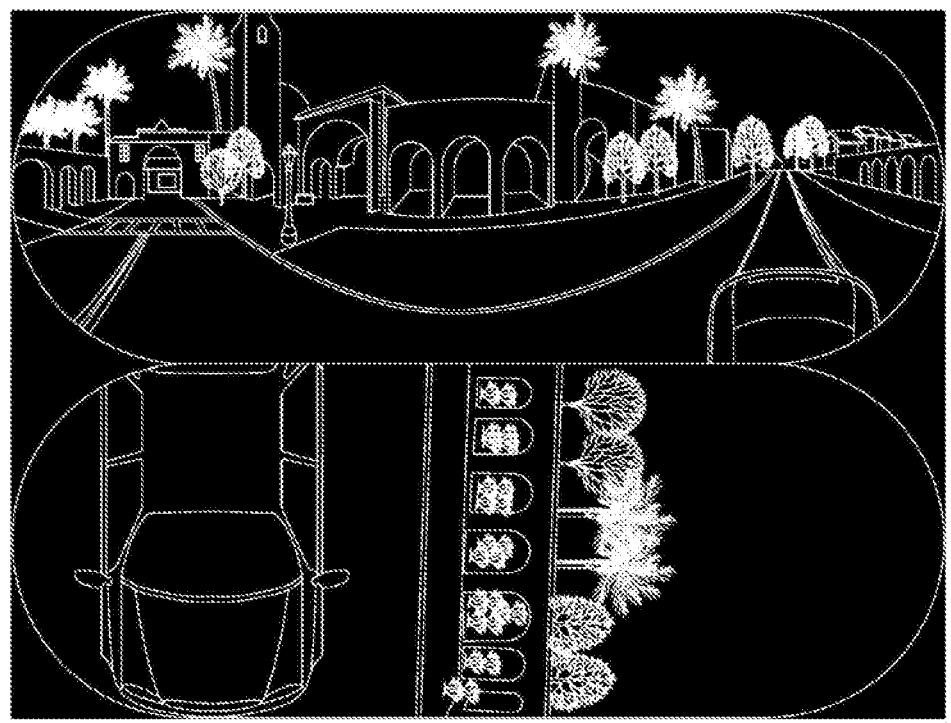

【Figure 4A】
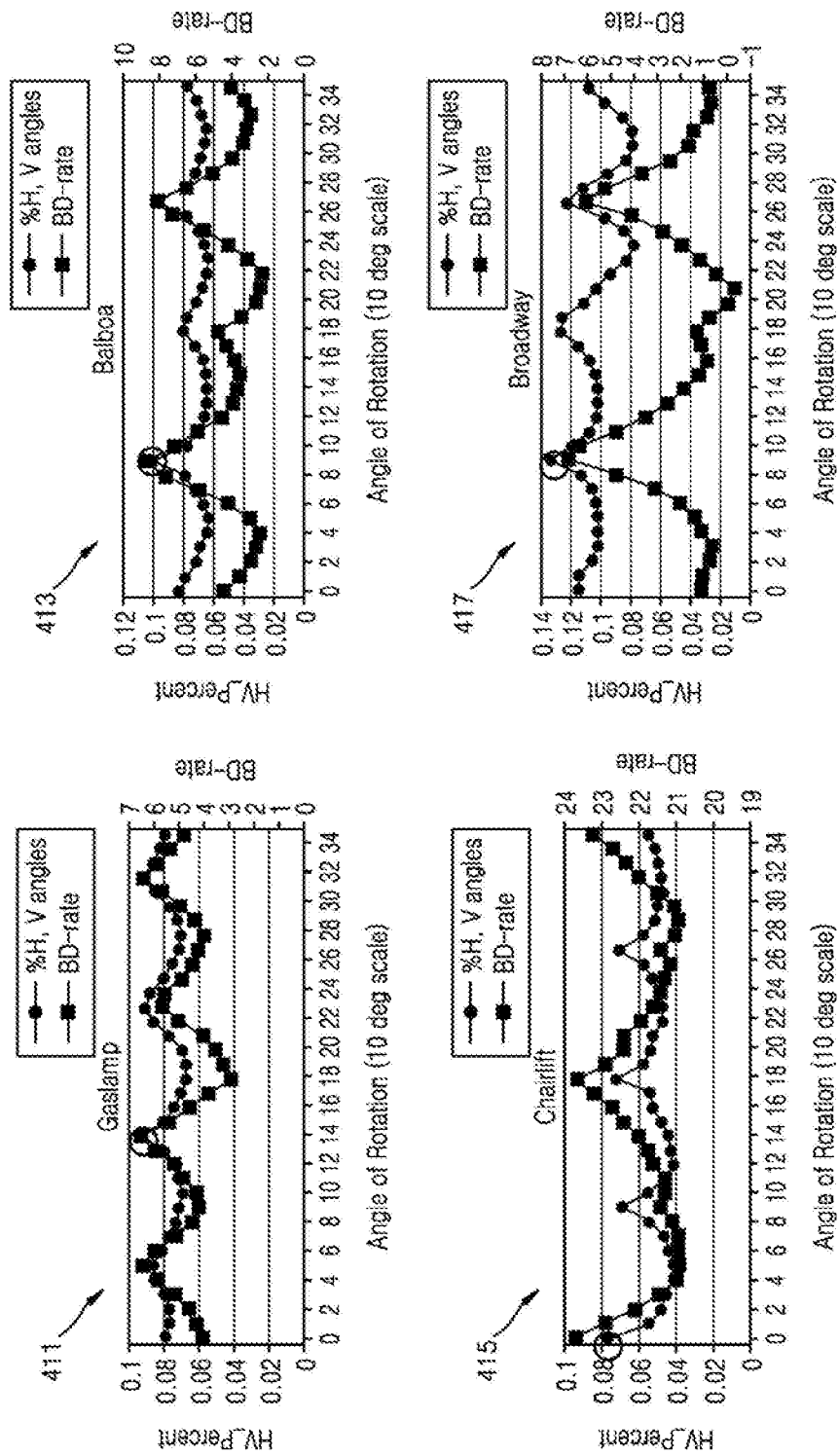

【Figure 4B】
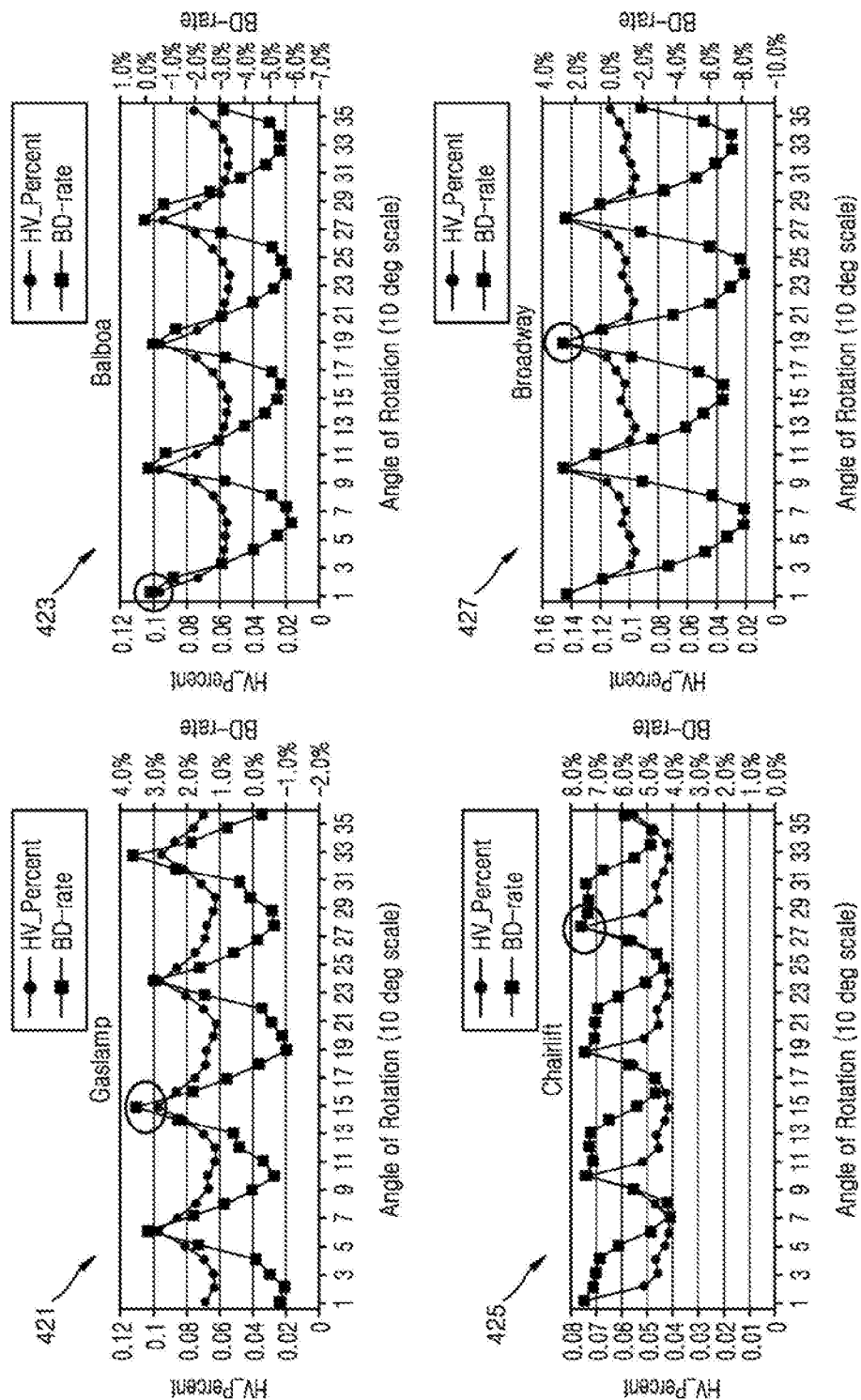

【Figure 5A】
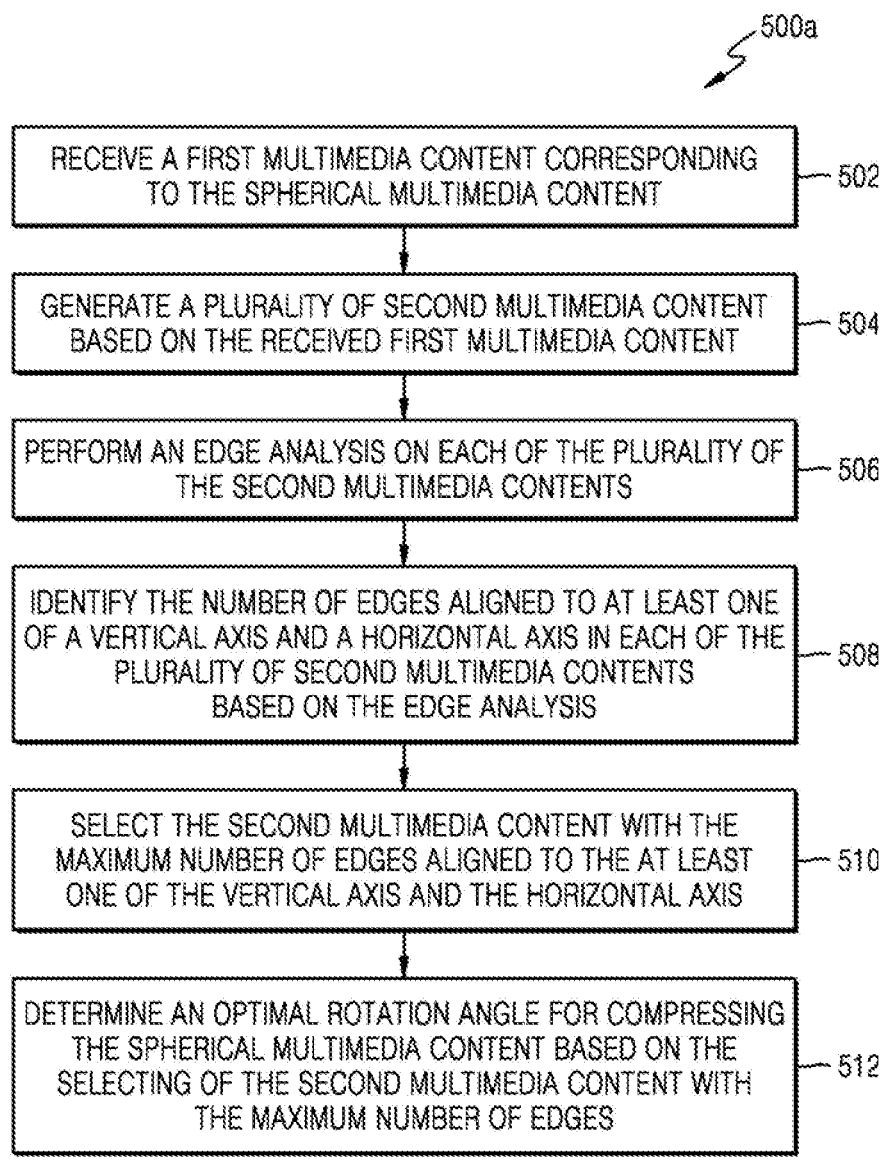

【Figure 5B】
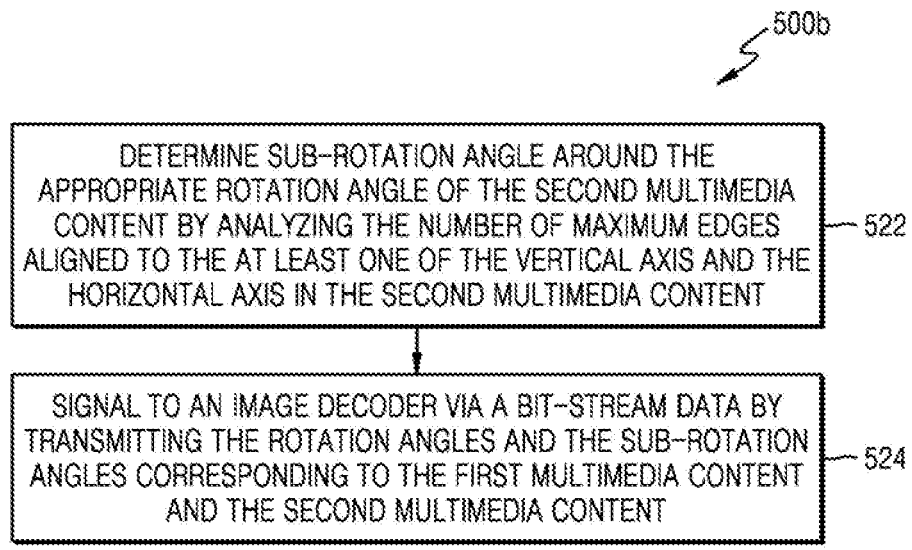
【Figure 5C】
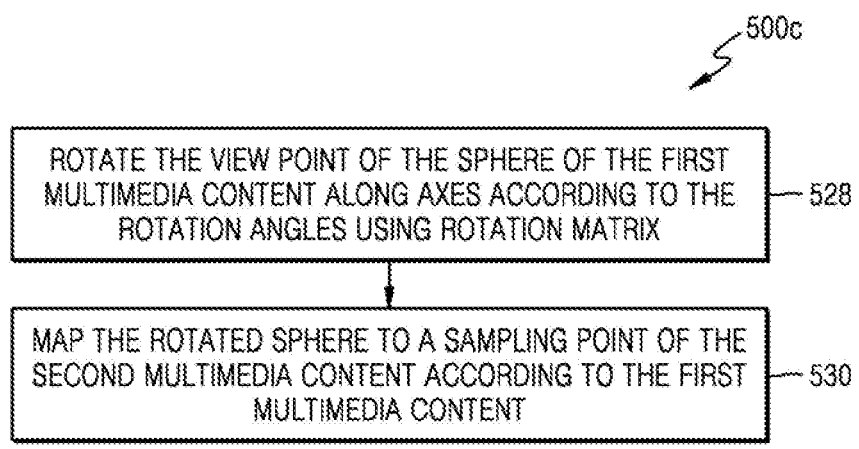

【Figure 5D】
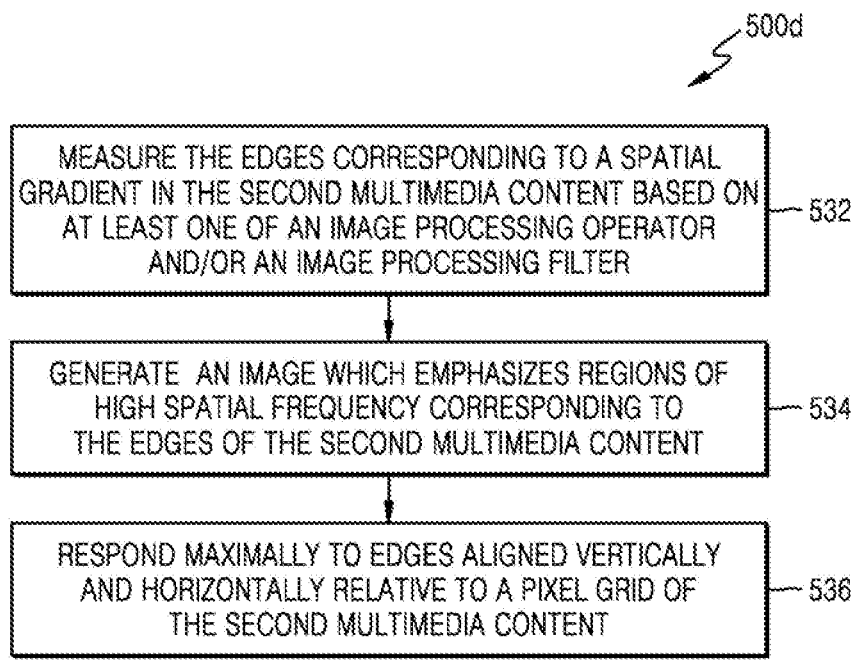

METHODS AND APPARATUS FOR DETERMINING ROTATION ANGLE FOR SPHERICAL MULTIMEDIA CONTENT

TECHNICAL FIELD

The disclosure relates to the field of media processing and more particularly to methods and apparatus for determining a rotation angle for spherical media content.

BACKGROUND ART

Currently, 360 degree cameras, multi-directional cameras or omni-directional cameras such as fish eye camera or panoramic camera, may output Equi-Rectanguar Projection (ERP) format media (such as videos, animations, images, and so on). If the ERP media is passed to the media code for image processing, the ERP media will be compressed. For example, if the media is a video, video compression may involve dividing the videos into blocks, and the blocks are processed and compressed. Accordingly, since the ERP media may have significant redundant data, the ERP format media may need to be converted to another more efficient projection format.

DISCLOSURE

Technical Solution

Accordingly, provided is a method and an apparatus for determining an optimal rotation angle during compression of a spherical multimedia content in which the processor may receive first multimedia content corresponding to the spherical multimedia content, generate a plurality of second multimedia contents based on the received first multimedia content by rotating the received first multimedia content to a plurality of rotation angles, perform an edge analysis on each of the plurality of the generated second multimedia contents, identify the number of edges aligned to at least one of a vertical axis and a horizontal axis in each of the generated plurality of second multimedia contents based on the edge analysis, select second multimedia content with the maximum number of edges aligned to at least one of the vertical axis and the horizontal axis, and determine an optimal rotation angle for compressing the spherical multimedia content based on the selecting of the second multimedia content with the maximum number of edges.

Advantageous Effects

In general, in 360 degree projection formats, some of the regions in the image or video may have less distortion as compared to other regions in the image or the video. For example, in ERP format, the equator region may have less distortion as compared to the pole regions. Accordingly, the ERP format video with different distortion levels may result in a distorted video, and in turn can adversely affect the viewing experience of a user. Also, redundant portions of the video may be processed by computing resources. This may add complexity and bandwidth burden to computing devices, especially in the decoding device which decodes areas outside the point of view of the user that are not actually viewed by the user. The disclosure makes it possible to reduce the transmission amount of data and complexity of a media and an efficient coding method.

DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1A illustrates an exemplary ERP projection according to an embodiment of the disclosure;

FIG. 1B illustrates an exemplary Icosahdral Projection (ISP) according to an embodiment of the disclosure;

FIG. 1C illustrates an exemplary Cube Map Projection (CMP) according to an embodiment of the disclosure;

FIG. 1D illustrates an exemplary Rotated Sphere Projection (RSP) according to an embodiment of the disclosure;

FIG. 2A illustrates a block diagram of an apparatus for determining an optimal rotation angle during compression of a spherical multimedia content according to an embodiment of the disclosure;

FIG. 2B illustrates a block diagram of a processing module according to an embodiment of the disclosure;

FIG. 3A illustrates a schematic diagram of a non-rotated image in one of a 360 degree projection format, according to an embodiment of the disclosure;

FIG. 3B illustrates a schematic diagram of a rotated image in one of a 360 degree projection format, according to an embodiment of the disclosure;

FIG. 3C illustrates a schematic diagram of gradient image for anon-rotated image, according to an embodiment of the disclosure;

FIG. 3D illustrates a schematic diagram of gradient image for a rotated image, according to an embodiment of the disclosure:

FIG. 4A illustrates a graph depicting Bjontegaard Delta (BD) rate of compression gain and Horizontal-Vertical (HV) percentage of image gradients for a Rotated Sphere Projection (RSP) image format, according to an embodiment of the disclosure;

FIG. 4B illustrates a graph depicting Bjontegaard Delta (BD) rate of compression gain and Horizontal-Vertical (HV) percentage of image gradients for a Cube Map Projection (CMP) image format, according to an embodiment of the disclosure;

FIG. 5A is a flow chart for determining an optimal rotation angle during compression of a spherical multimedia content, according to an embodiment of the disclosure;

FIG. 5B is a flow chart for signaling to an image decoder via a bit-stream data, according to an embodiment of the disclosure;

FIG. 5C is a flow chart for mapping the rotated sphere to a sampling point of the second multimedia content according to the first multimedia content, according to an embodiment of the disclosure; and FIG. 5D is a flow chart for responding maximally to edges aligned vertically and horizontally relative to a pixel grid of the second multimedia content, according to an embodiment of the disclosure.

BEST MODE

Accordingly, provided is a method and an apparatus for determining an optimal rotation angle during compression of a spherical multimedia content in which the processor may receive first multimedia content corresponding to the spherical multimedia content, generate a plurality of second multimedia contents based on the received first multimedia content by rotating the received first multimedia content to a plurality of rotation angles, perform an edge analysis on each of the plurality of the generated second multimedia contents, identify the number of edges aligned to at least one of a vertical axis and a horizontal axis in each of the generated plurality of second multimedia contents based on the edge analysis, select second multimedia content with the maximum number of edges aligned to at least one of the vertical axis and the horizontal axis, and determine an optimal rotation angle for compressing the spherical multimedia content based on the selecting of the second multimedia content with the maximum number of edges.

Accordingly, provided is a non-transitory computer readable medium storing instructions thereon that, when executed, instruct at least one processor to perform a method, the method comprising receiving, by a processor, first multimedia content corresponding to the spherical multimedia content; generating a plurality of second multimedia contents based on the received first multimedia content by rotating the received first multimedia content to a plurality of rotation angles; performing an edge analysis on each of the plurality of the generated second multimedia contents; identifying the number of edges aligned to at least one of a vertical axis and a horizontal axis in each of the generated plurality of second multimedia contents based on the edge analysis; selecting second multimedia content with the maximum number of edges aligned to at least one of the vertical axis and the horizontal axis; and determining an optimal rotation angle for compressing the spherical multimedia content based on the selecting of the second multimedia content with the maximum number of edges.

Mode for Invention

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods and apparatus for determining an optimal rotation angle during compression of spherical multimedia content and efficiently signalling to the receiver for performing inverse rotation of the spherical multimedia content before rendering media. Referring now to the drawings, and more particularly to FIG. 1A through 5D, where similar reference characters denote corresponding features consistently throughout the figures, there are shown example embodiments.

In general, in 360 degree projection formats, some of the regions in the image or video may have less distortion as compared to other regions in the image or the video. For example, in ERP format, the equator region may have less distortion as compared to the pole regions. Accordingly, the ERP format video with different distortion levels may result in a distorted video, and in turn can adversely affect the viewing experience of a user. Also, redundant portions of the video may be processed by computing resources. This may add complexity and bandwidth burden to computing devices, especially in the decoding device which decodes areas outside the point of view of the user that are not actually viewed by the user. In this way, it is possible to reduce the transmission amount of data and complexity of a media and an efficient coding method may be required.

Also, 360 degree projection formats such as Icosahedron Projection (ISP), Cube Map Projection (CMP), Rotated Sphere Projection (RSP) and Equi-Rectangular Projection (ERP), may contain non-linearities, as the 360 degree image is projected from a sphere. Accordingly, the non-linearities may result in the gradients present in the media being curved. The curved gradient image may not be suitably encoded using conventional video codecs such as High Efficiency Video Coding (HEVC) or Advanced Video Coding (AVC). Accordingly, rotated 360 degree content may be advantageous to generate projected planar video, which can reduce number of curved gradients.

FIG. 1A illustrates an exemplary ERP according to an embodiment of the disclosure. Referring to FIG. 1A, a spherical map may be projected onto a two dimensional plane based on ERP.

FIG. 1B illustrates an exemplary Icosahedral Projection (ISP) according to an embodiment of the disclosure. Referring to FIG. 1B, a spherical map may be projected onto an icosahdron based on ISP.

FIG. 1C illustrates an exemplary Cube Map Projection (CMP) according to an embodiment of the disclosure. Referring to FIG. 1C, a spherical map may be projected onto a cube based on CUP.

FIG. 1D illustrates an exemplary Rotated Sphere Projection (RSP) according to an embodiment of the disclosure. Referring to FIG. 1, a spherical map may be projected onto a rotated sphere based on RSP.

FIG. 2A illustrates a block diagram of an apparatus 100 for determining an optimal rotation angle during compression of a spherical multimedia content according to an embodiment of the disclosure.

Referring to FIG. 2A, the apparatus 100 may include, but not limited to, a memory unit 102, a storage unit 106, a display 110, and a processor 112. The apparatus 100 may further include a processing module 104 implemented in the memory unit 102. When the machine readable instructions are executed, the processing module 104 and/or the processor 112 may process the data in a computing environment. Further, the apparatus 100 can also be referred herein as an electronic device 100 and the apparatus 100 can act as a server. The apparatus 100/electronic device 100 can be, but not limited to, a mobile phone, a smart phone, a tablet, a handheld device, a phablet, a laptop, a computer, a wearable computing device, a server, and so on. The apparatus 100 may include other components such as input/output interface (s), communication interface(s) (not shown) and so on. The apparatus 100 may comprise a user application interface (not shown) and an application management framework (not shown) and an application framework (not shown) for determining the optimal rotation angle during compression of the spherical media. The application framework may include different modules and sub modules to execute the operation(s) for determining the optimal rotation angle during compression of the spherical media. The application framework can be a software library that provides a fundamental structure to support the development of applications for a specific environment. The application framework may also be used in developing graphical user interface (GUI) and web-based applications. Further, the application management framework may be responsible for the management and maintenance of the application and definition of the data structures used in databases and data files. In an embodiment, the methods herein may be implemented using the apparatus 100. The embodiments herein may perform specified manipulations of data or information in response to a command or set of commands provided by a user. In an alternative embodiment, the methods herein may be implemented using apparatus 100 such as server (not shown). The server may be implemented using apparatus 100. The apparatus 100 can operate as a standalone device or a connected (e.g., networked) device that connects to other computer systems. In a networked deployment, the apparatus 100 may operate as the server or client in a server-client network environment, or as a peer device in a peer-to-peer (or distributed) network environment. Further, while only a single computer system 700 is illustrated, a plurality of computing systems 700 may operate to jointly execute instructions to perform any one or more of the methods discussed herein.

In an example, the apparatus 100 can be communicatively connected to a 360 degree camera (not shown) and a display device (such as a monitor, television, display, and soon). The 360 degree camera may capture spherical media and transmit the captured spherical media to the apparatus 100 or electronic device 100. The apparatus 100 or electronic device 100 may process the received media and transmit the received media to the display device, which can display the processed media. Further, the apparatus 100 may also display the processed media without transmitting to the display device. Accordingly, a pre-processing method such as a plurality of image merging or stitching may be performed. The encoding may be performed by apparatus 100 for encoding and outputting a bit-stream. The bit-stream transmission module (not shown) in the apparatus 100 may receive the synchronized image to transmit to the decoding device such as the apparatus 100, the TV or electronic device 100. Further, the media may be decoded and processed to output on the display.

Further, the sub-image of the input image or 360 degree image may be arranged in different ways. The spatial structure information may be additionally included in the table index for signaling the allocation information. For example, at least one of, but not limited to, an Equi-Rectangular Projection (ERP), a Cube Map Projection (CMP), Adjusted Equal-area Projection (AEP), an Equal-Area Projection (EAP), an OctaHedron Projection (OHP), a Viewport generation using rectilinear projection, an IcoSahedron Projection (ISP), a Crasters Parabolic Projection for CPP-PSNR calculation, a Truncated Square Pyramid Projection (TSP), a Segmented Sphere Projection (SSP), an Adjusted Cubemap Projection (ACP), a Rotated Sphere Projection (RSP), an Equi-angular Cubemap Projection (FAC), a pyramid-shaped cutting projection (Truncated Pyramid Projection, TPP), Equatorial Cylindrical Projection (ECP) and soon, can be illustrated/arranged or converted to different image projection format(s).

Although, the example explains the conversion of 360 degree/spherical projection format, the embodiments herein are not limited to the 360 degree/spherical projection format. The embodiments herein can be applied to various projection transformation formats comprising of CP, ISP, OHP, TPP, SSP, and a plurality of faces such as ECP or RSP. In an example, if the 360 degree projection media is converted to 2D, then at least one of, but not limited to, appeared (FRP), CMP, ISP, OHP, TPP, SSP, ECP or RSP or the like can be used. In an example, the spherical multimedia content can be, but not limited to, a video, an image, an animation, and so on.

The spherical multimedia content or projection format(s) may include an image gradient(s) and an edge(s). The image gradient can be a directional change in the intensity or color in an image. For example, a canny edge detection method may be use image gradient for edge detection. Further, a spatial gradient can also be included in spherical multimedia content or projection format(s). The spatial gradient is a gradient whose components are spatial derivatives, i.e., rate of change of a given scalar physical quantity with respect to the position coordinates. In an example, the edge detection methods may search edges based on zero-crossing or by first analyzing a measure of edge strength. Usually a first-order derivative expression such as a gradient magnitude, and then searching for local directional maxima of the gradient magnitude.

The implementations described herein are primarily discussed in the context of spherical content images that are captured, e.g., using a spherical camera system having two or more cameras (e.g., a front-facing and a rear-facing camera). However, it should be appreciated that the methods described herein can be equally applied to other image formats.

In an embodiment, the apparatus 100 may receive or obtain a first multimedia content corresponding to the spherical multimedia content. The apparatus 100 may generate a plurality of second multimedia contents using the received first multimedia content. The plurality of second multimedia contents may be generated by rotating the received first multimedia content to a plurality of different angles. The first multimedia content and the plurality of second multimedia contents may have a project ion format of an ERP, a CMP, an AEP, an OIP, a Viewport generation using rectilinear projection, an ISP, a Crasters Parabolic Projection for CPP-PSNR calculation, a TSP, a SSP, an ACP, a RSP, an EAC, a TPP, and an ECP.

In an embodiment, the apparatus 100 may per form an edge analysis on an image included in each of the plurality of the generated second multimedia content. The edges may include at least one of edge strength, a gradient, a gradient magnitude and a gradient angle. The apparatus 100 may analyze edges with a gradient magnitude associated with the edge strength, and a gradient angle for each of gradients, associated with the transformed plurality of the second multimedia contents. The apparatus 100 may determine a horizontally aligned gradient axis and vertically aligned gradient axis in the gradients associated with the transformed plurality of the second multimedia contents. The apparatus 100 may identify a number of edges aligned to at least one of a vertical axis and a horizontal axis in each of the plurality of second multimedia contents based on the edge analysis on each of plurality of the second multimedia content. The apparatus 100 may select the second multimedia content with the maximum number of edges aligned to at least one of the vertical axis and the horizontal axis. The selected second multimedia content corresponds to the optimal rotation angle for compressing the spherical multimedia content.

The apparatus 100 may determine sub-rotation angle around the optimal rotation angle of the second multimedia content by analyzing the number of maximum edges aligned to at least one of the vertical axis and the horizontal axis in the second multimedia content. The maximum gradients are aligned to the vertical axis and horizontal axis of the second multimedia content. The apparatus 100 may signal to an image decoder via a bit-stream data, by transmitting the rotation angles and the sub-rotation angles corresponding to the first multimedia content and the second multimedia content. The apparatus 100 may rotate the viewpoint of the sphere of the first multimedia content along axes according to the rotation angles using a rotation matrix. The rotation angle may include at least one of a yaw, a pitch, and a roll.

The apparatus 10 may map the rotated sphere to a sampling point of the second multimedia content according to the first multimedia content.

The apparatus 100 may measure the edges corresponding to a spatial gradient in the second multimedia content, using at least one of an image processing operator and an image processing filter. The apparatus 100 may generate image emphasizing regions of high spatial frequency, corresponding to the edges of the second multimedia content. The apparatus 100 may respond to edges aligned vertically and horizontally relative to a pixel grid of the second multimedia content.

The spherical multimedia content may be received from a communicatively coupled 360 degree camera. In an embodiment, rotating the first multimedia content to plurality of different angles may include rotating with respect to at least one of a yaw, a pitch, and a roll. For example, a plurality of digital cameras may be arranged in circular order to form a full sphere. The spherical arrangement by the digital cameras al lows the maximum coverage, not only gathering a 360 degree panorama, but gathering total image data for a scene. In another example, a single camera can be panned across 360 degree to capture multiple images/frames.

In an embodiment, the optimal rotation angle may include aligning the gradients substantially to the horizontal axis and the vertical axis. In an example, rotating of the view point of the sphere may include rotating the sphere by at least one of 10 degrees, 1 degree, and 2 degrees, in an amount of a yaw, a pitch, and a roll. In an embodiment, determining of the horizontally aligned gradient axis and vertically aligned gradient axis may include analyzing the compression gain for each rotation angle of the second multimedia content. In an example, determining of the horizontally aligned gradient axis and the vertically aligned gradient axis of the second multimedia content may include analyzing the horizontal axis between a plurality of degrees and the vertical axis between a plurality of degrees. For example, analyzing of the horizontal axis may be performed between −5 to 5 degrees and analyzing of the vertical axis may be performed between 85 to 95 degrees.

In an embodiment, the signaling via a bit-stream to the decoder may include indicating to the image decoder, the omni-directional projection of yaw rotation, pitch rotation, and/or roll rotation corresponding to the sphere of the first multimedia content. For example, the first multimedia content can be an ERP image and the second multimedia content can be an RSP image.

In an embodiment, the foregoing operations may be performed by the processor 112 of the apparatus 100.

FIG. 2A illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

FIG. 2B illustrates a block diagram of a processing module according to an embodiment of the disclosure.

In an embodiment, the apparatus 100 may include a processing module 104 residing in the memory unit 102. The processing module 104 may include a plurality of sub modules. The plurality of sub modules may include a receiving module 202, a generating module 204, an edge analysis performing module 206, an identifying module 208 and a selecting module 210.

The receiving module 202 may receive the first multimedia content corresponding to the spherical multimedia content. The generating module 204 may generate a plurality of second multimedia contents using the received first multimedia content by rotating the received first multimedia content to a plurality of different angles. The edge analysis performing module 206 may perform an edge analysis on each of the plurality of the second multimedia content. The identifying module 208 may identify a number of edges aligned to at least one of a vertical axis and/or a horizontal axis in each of the generated plurality of second multimedia content based on the edge analysis on each of the plurality of the generated second multimedia content. The selecting module 210 may select the second multimedia content with the maximum number of edges aligned to the at least one of the vertical axis and/or the horizontal axis. The selected second multimedia content may correspond to the optimal rotation angle for compressing the spherical multimedia content.

In an embodiment, the receiving module 202, the generating module 204, the edge analysis performing module 206, the identifying module 208 and the selecting module 210 may be implemented as at least one hardware processor and the operations performed by the processing module 104 may be performed by the processor 112.

The embodiments herein can include hardware and software components. The embodiments that may be implemented in software include, but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruct ion execution system, apparatus, or device.

FIG. 3A illustrates a schematic diagram of a non-rotated image in one of a 360 degree projection format, according to an embodiment of the disclosure. FIG. 38 illustrates a schematic diagram of a rotated image in one of a 360 degree projection format, according to an embodiment of the disclosure.

FIG. 3A illustrates an image frame according to a Balboa a sequence in an RSP. FIG. 3B illustrates the image frame according to the Balboa sequence in the RSP applying a rotation of the image frame with an optimal angle. The first image data associated with a first portion of interest from the first multimedia content can be retrieved by the processor 112 of the apparatus 100. The first multimedia content may take a number of different forms. For example, the first multimedia content may include a static image, a series of frame or pictures. The static image may be desirable for immersing a user in a desired scene (when the user is located near a landmark site). Also, the source image captured by a camera may include a media sequence of a scene or scenes. For example, the first portion of interest may include image data associated with a first frame (or a first sequence of media frames) for the media sequence, while the second image data associated with the new portion of interest may be associated with a second frame (or a second sequence of media frames) for the media sequence.

In some implementations, the processor 112 may retrieve first image data associated with an equatorial portion of the first multimedia content. Also, the processor 112 may retrieve a view point that is associated with a particular view angle (and equator) of the first multimedia content (e.g., spherical image data). For example, the view point may be rendered in an RP of the spherical image at the equator having a latitude of 0 degree and a longitudinal range of 120 degree (e.g., from +60 degree to −60 degree).

The three dimensional (3D) spherical coordinates (i.e., latitude and longitude space) are mapped to the ERP two-dimensional surface. Specifically, the longitude of original spherical projection may run along the horizontal axis of the ERP format image, and the latitude may run along the vertical axis of the ERP format image. Edges in the media content may be aligned to the horizontal and vertical directions. The media content may be rotated along the (X, Y, Z) axis before projection. The rotation angle along three axes (X, Y, and Z) in the bit-stream may be detected or selected so that a decoder can perform an inverse process before rendering the media content.

The RSP format images are computed at a plurality of angles for a given spherical media content. In an embodiment, the RSP format images can be computed at 36 different angles (separated by 10 degrees each such as 10, 20, 30, and so on). For the each of these images with different angles, a canny edge detection can be applied to obtain a gradient magnitude and angles for each of the gradients. For each of the RSP for images, the amount of gradients is analyzed in horizontal axis and vertical axis (for example, between −5 to 5 degrees and 85 to 95 degrees). When it is detected that the image has the highest gradients aligned to vertical axis and horizontal axis, the best angle for rotating the image is determined. After arriving at the best angle, the above steps can be also performed at the finer granularities (for example, at a 1 degree difference).

58The rotation angles need to be signaled explicitly to the decoder, as the decoder may encode additional supplemental enhancement information (SEI) and media usability information (VUI) in the bit-stream.

In an example, the bit-stream can be transmitted to the decoder as follows.

|  | {Descriptor |
|---|---|
| omnidirectional_projection_indication(payload Size) | |
| omni_flag | u(1) |
| if(omni_flag) { | |
|     projection_type | u(4) |
|     packing_type | u(2) |
|     yaw_rot | i(32) |
|     pitch_rot | i(32) |
|     roll_rot | i(32) |
|     dblk_off | u(1) |
|     beta_val | u(32) |
| } | |
| } | |

FIG. 3C illustrates a schematic diagram of gradient image for a non-rotated image, according to an embodiment of the disclosure. FIG. 3D illustrates a schematic diagram of gradient image for a rotated image, according to an embodiment of the disclosure.

The gradient magnitude and gradient angle for each of the gradients of the second multimedia content may be analyzed by an edge detection method such as canny edge detection. For each 36 different angle based images, a plurality of gradients at horizontal axis and vertical axis (for example, between −5 to 5 degrees and 85 to 95 degrees) are calculated. When it is detected that the image has the highest gradients aligned to vertical and horizontal axes, the best angle can be determined. After determining the best angle, the same process at the finer granularities (e.g. 1 degree resolution around the optimal angle) can be performed. The most complex region of the image may be placed at the top lobe of the RSP that has the least distortion in projection.

The edge analysis can be performed by applying image processing operator such as a Sobel operator or a Sobel filter. The Sobel operator or Sobel filter can be used particularly for an edge detect ion of image. Applying the Sobel operator or Sobel filter may generate image emphasizing edges.

FIG. 4A illustrates a graph depicting Bjontegaard Delta (BD) rate of compression gain and Horizontal-Vertical (HV) percentage of image gradients for a Rotated Sphere Projection (RSP) image format, according to an embodiment of the disclosure. FIG. 4B illustrates a graph depicting Bjontegaard Delta (BD) rate of compression gain and Horizontal-Vertical (HV) percentage of image gradients for a Cube Map Projection (CMP) image format, according to an embodiment of the disclosure.

Referring to FIG. 4A and FIG. 4B, the graph shows that peak of BD rate (i.e. the compression gain for compression system) may coincide with the peak of HV percentage. The BD rate may be used to compare two-compression system output objectively and the BD graph depicts Peak Signal to Noise Ratio (PSNR) (i.e., objective quality) versus bit-rate. The graph shows the correlation between BD-rate and HV gradient percentage with plots at every 10 degree rotation for the test sequences.

While the following discussion is discussed primarily in terms of the ERP, it is readily appreciated that the principles described herein may be applied to other forms of aforementioned projection formats.

The ERP is a projection format which transforms the image in one surface (face), u, v coordinates on the sphere (sphere) corresponding to the coordinate position conversion and the u, v coordinate position corresponding to the sampling position of the two-dimensional images. The transformation process may include a latitude coordinate conversion processing. Accordingly, the spatial configuration information may include an index and ERP, information (for example, face index is set to 0), a single face.

The CMP is a projection format which projects a sphere image to the image of the six regular square surface (face) including PX, PY, PZ, NX, NY, NZ where P represents a positive, N represents a negative, and X, Y, and Z represent the Cartesian coordinate.

The RSP is an example of the 360 degree image divided into two regions of equal size and stretched/padded size as shown in FIG. 1D. A transformation of the divided image to a two-dimensional image may include arranging the images with tow regions into the image in two rows. The RSP may implement the above arrangement using six square faces as a 3×2 packing arrangement similar to the CMP. Accordingly, the transformed image may include a second port ion of the media image and the first region at the bottom segment of the upper segment.

Although the graph is plotted with the RSP and CMP format, it should be understood that the embodiments may be implemented with other projection formats.

FIG. 5A is a flow chart for determining an optimal rotation angle (luring compression of a spherical multimedia content, according to an embodiment of the disclosure.

In operation 502, the processor 112 controls to receive the first multimedia content corresponding to the spherical multimedia content. In operation 504, the processor 112 may generate a plurality of second format multimedia contents based on the received first multimedia content. In operation 506, the processor 112 may perform an edge analysis on each of the plurality of the generated second multimedia contents. In operation 508, the processor 112 may identify the number of edges aligned to at least one of the vertical axis and the horizontal axis in each of the generated plurality of the second multimedia contents, based on the edge analysis performed on each of the plurality of the generated second multimedia contents. In identifying the number of the edges, the processor 112 may further analyze a compression gain for each rotation angle of the second multimedia content and may analyze the horizontal axis between a plurality of degrees and the vertical axis between a plurality of degrees. In operation 510, the processor 112 may select at least one second multimedia content with the maximum number of edges aligned to at least one of the vertical axis and the horizontal axis among the plurality of the second multimedia contents. In operation 512, the processor 112 may determine an optimal rotation angle for compressing the spherical multimedia content based on the selection of the second multimedia content with the maximum number of edges among the plurality of second multimedia contents.

The various actions in the process 500*a* may be performed in the order presented, in a different order or simultaneously. Further, in some embodiments, some actions listed in FIG. 5A may be omitted.

FIG. 5I is a flow chart for signaling to an image decoder via a bit-stream data, according to an embodiment of the disclosure.

In operation 522, the processor 112 may determine a sub-rotation angle around the optimal rotation angle of the second multimedia content by analyzing the number of maximum edges aligned to at least one of the vertical axis and the horizontal axis in the second multimedia content. In operation 524, the processor 112 may signal to an image decoder via a bit-stream data by transmitting the rotation angle(s) and the sub-rotation angle(s) corresponding to the first multimedia content and the second multimedia content.

The various actions in method 500l) may be per formed in the order presented, in a different order or simultaneously. Further, in some embodiments, some actions listed in FIG. FB may be omitted.

FIG. C is a flow chart for mapping the rotated sphere to a sampling point of the second multimedia content according to the first multimedia content, according to an embodiment of the disclosure.

In operation 528, the processor 112 may rotate the view point of the sphere of the first multimedia content along axes according to the rotation angles using rotation matrix. In operation 530, the processor 112 may map the rotated sphere to a sampling point of the second multimedia content according to the first multimedia content.

The various actions in method 500*c* may be performed in the order presented, in a different order or simultaneously. Further, in some embodiments, some actions listed in FIG. 5C may be omitted.

FIG. 5D is a flow chart for responding maximally to edges aligned vertically and horizontally relative to a pixel grid of the second multimedia content, according to an embodiment of the disclosure.

In operation 532, the processor 112 may measure the edges corresponding to a spatial gradient in the second multimedia content based on at least one of an image processing operator and an image processing filter. In operation 534, the processor 112 may generate an image which emphasizes regions of high spatial frequency corresponding to the edges of the second multimedia content. In operation 536, the processor may maximally respond to edges aligned vertically and horizontally relative to a pixel grid of the second multimedia content.

The various act ions in method 500*d* may be performed in the order presented, in a different order or simultaneously. Further, in some embodiments, some actions listed in FIG. 5D may be omitted.

Accordingly, the embodiments herein provide methods and systems for efficient compression of 360 degree/spherical media, hereby making the content more media codec friendly and increasing the compression gain and subjective quality of the media. The embodiments herein achieve methods and systems for efficient compression of 360 degree/spherical media(s), thereby providing the content with more media codec friendly and increasing the compression gain and subjective quality of the media. Embodiments herein provide methods and apparatus to arrive at an optimal rotation parameter for a given spherical media, without encoding the media (with only pre-processing). Embodiments herein rotate the spherical media (before projection) in such a way that the after projection, compression gain is maximized for underlying content. Embodiments herein make the encoding process to be more effective by rotating the spherical content in such a way that the most active (complex for encoding) region resides within the part with less distortion and the part with higher distortion stores simple contents and aligning the content is aligned to the horizontal and vertical directions. Embodiments herein help in coding picture with larger Coding Unit (CU) size and smaller motion vectors as optimal rotation results in the gradients being aligned with substantially horizontal and vertical angles. Embodiments herein enable the resultant image after rotation to provide better compression gain.

The embodiments disclosed herein can be implemented through at least one software program running on at least one hardware device and performing network management functions to control the elements. The elements shown in FIG. 2A can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. A method of determining an optimal rotation angle during compression of a spherical multimedia content, the method comprising:

receiving, by a processor, first multimedia content corresponding to the spherical multimedia content;

generating a plurality of second multimedia contents based on the received first multimedia content by rotating the received first multimedia content to a plurality of rotation angles by a predetermined interval;

performing an edge analysis on each of the generated plurality of second multimedia contents;

identifying a number of edges aligned to at least one of a vertical axis and a horizontal axis in each of the generated plurality of second multimedia contents based on the edge analysis;

selecting at least one second multimedia content among the plurality of second multimedia contents with a maximum number of edges aligned to at least one of the vertical axis and the horizontal axis; and determining an optimal rotation angle for compressing the spherical multimedia content by selecting an angle corresponding to the at least one second multimedia content with the maximum number of edges as the optimal rotation angle, wherein the first multimedia content and the at least one second multimedia content comprises a static image or a series of frames.

2. The method of claim 1, further comprising:

determining sub-rotation angle around the optimal rotation angle of the at least one second multimedia content by analyzing a number of the maximum number of edges, wherein the sub-rotation angle comprises a plurality of angles around the determined optimal rotation angle; and signaling to an image decoder via a bit-stream data by transmitting the optimal rotation angle and the sub-rotation angle corresponding to the first multimedia content and the at least one second multimedia content.

3. The method of claim 1, wherein the generating of the plurality of second multimedia contents comprises rotating the first multimedia content to the spherical multimedia content with a predetermined yaw rotation, pitch rotation, or roll rotation.

4. The method of claim 1, further comprising:

measuring the edges corresponding to a spatial gradient in the at least one second multimedia content based on at least one of an image processing operator and an image processing filter;

generating an image which emphasizes regions of high spatial frequency corresponding to the edges of the at least one second multimedia content; and responding to the edges aligned vertically to the vertical axis or horizontally to the horizontal axis relative to a pixel grid of the at least one second multimedia content.

5. The method of claim 1, wherein the edges comprise at least one of an edge strength, a gradient, a gradient magnitude and a gradient angle of each of the plurality of second multimedia contents.

6. The method of claim 5, wherein generating the plurality of second multimedia contents comprises analyzing the gradient magnitude associated with the edge strength and the gradient angle for each of the gradient of the plurality of second multimedia contents.

7. The method of claim 5, wherein the determining of the optimal rotation angle comprises aligning the gradient to the horizontal axis and the vertical axis.

8. The method of claim 1, wherein the identifying the number of edges aligned to the at least one of the vertical axis and the horizontal axis in each of the plurality of second multimedia contents comprises determining a number of horizontally aligned gradients and a number of vertically aligned gradients in a converted gradient image associated with the plurality of second multimedia content.

9. The method of claim 1, wherein the identifying the number of edges aligned to the at least one of the vertical axis and the horizontal axis comprises analyzing a compression gain for each rotation angle of the at least one second multimedia content.

10. The method of claim 1, wherein the identifying the number of edges aligned to the at least one of the vertical axis and the horizontal axis of the at least one second multimedia content comprises analyzing the horizontal axis between a plurality of degrees and the vertical axis between a plurality of degrees.

11. The method of claim 1, wherein the first multimedia content and the at least one second multimedia content have a projection format with at least one of an Equi Rectangular Projection (ERP), a Cube Map Projection (CMP), an Adjusted Equal-area Projection (AEP), an Octahedron Projection (OHP), a Viewport generation using rectilinear projection, an Icosahedron Projection (ISP), a Crasters Parabolic Projection for CPP-PSNR calculation, a Truncated Square Pyramid (TSP) projection, a Segmented Sphere Projection (SSP), an Adjusted Cubemap Projection (ACP), a Rotated Sphere Projection (RSP), an Equi-angular Cubemap Projection (EAC), and an Equatorial Cylindrical Projection (ECP).

12. An apparatus for determining an optimal rotation angle during compression of a spherical multimedia content, the apparatus comprising:

a memory unit; and a processor configured to:

receive first multimedia content corresponding to the spherical multimedia content, generate a plurality of second multimedia contents based on the received first multimedia content by rotating the received first multimedia content to a plurality of rotation angles by a predetermined interval, perform an edge analysis on each of the generated plurality of second multimedia contents, identify a number of edges aligned to at least one of a vertical axis and a horizontal axis in each of the generated plurality of second multimedia contents based on the edge analysis, select at least one second multimedia content among the plurality of second multimedia contents with a maximum number of edges aligned to at least one of the vertical axis and the horizontal axis, and determine an optimal rotation angle for compressing the spherical multimedia content by selecting an angle corresponding to the at least one second multimedia content with the maximum number of edges as the optimal rotation angle, wherein the first multimedia content and the at least one second multimedia content comprise a static image or a series of frames.

13. A non-transitory computer readable medium storing instructions thereon that, when executed, instruct at least one processor to perform a method, the method comprising:

receiving first multimedia content corresponding to a spherical multimedia content;

generating a plurality of second multimedia contents based on the received first multimedia content by rotating the received first multimedia content to a plurality of rotation angles by a predetermined interval;

performing an edge analysis on each of the generated plurality of second multimedia contents;

identifying a number of edges aligned to at least one of a vertical axis and a horizontal axis in each of the generated plurality of second multimedia contents based on the edge analysis;

selecting at least one second multimedia content among the plurality of second multimedia contents with a maximum number of edges aligned to at least one of the vertical axis and the horizontal axis; and determining an optimal rotation angle for compressing the spherical multimedia content by selecting an angle corresponding to the at least one second multimedia content with the maximum number of edges as the optimal rotation angle, wherein the first multimedia content and the at least one second multimedia content comprise a static image or a series of frames.

* * * * *